Dec. 24, 1968   R. D. LOWRY ET AL   3,417,839
AIR VENTILATOR SOUND CONTROL ASSEMBLY
Filed Jan. 31, 1967   2 Sheets-Sheet 1
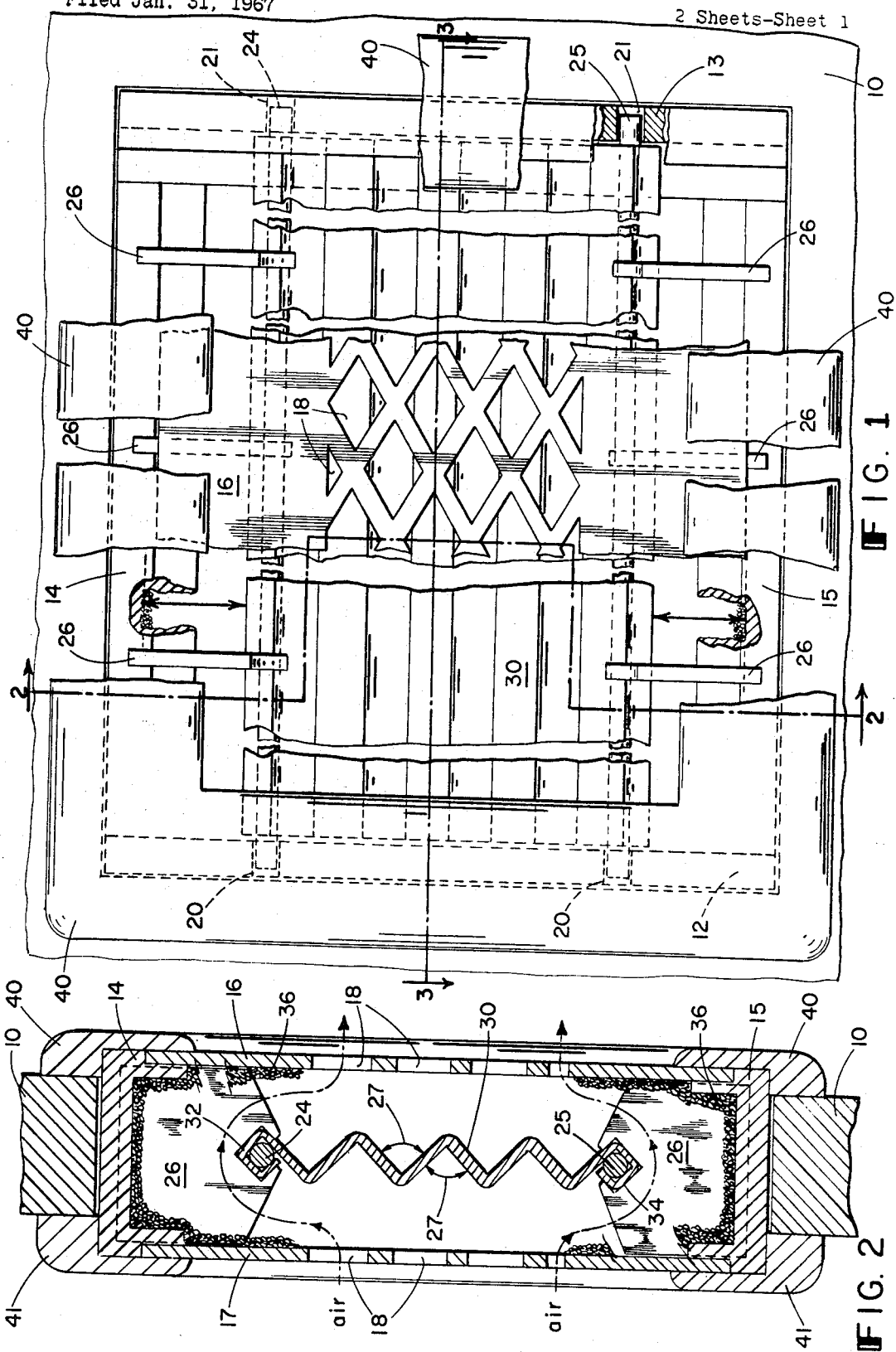

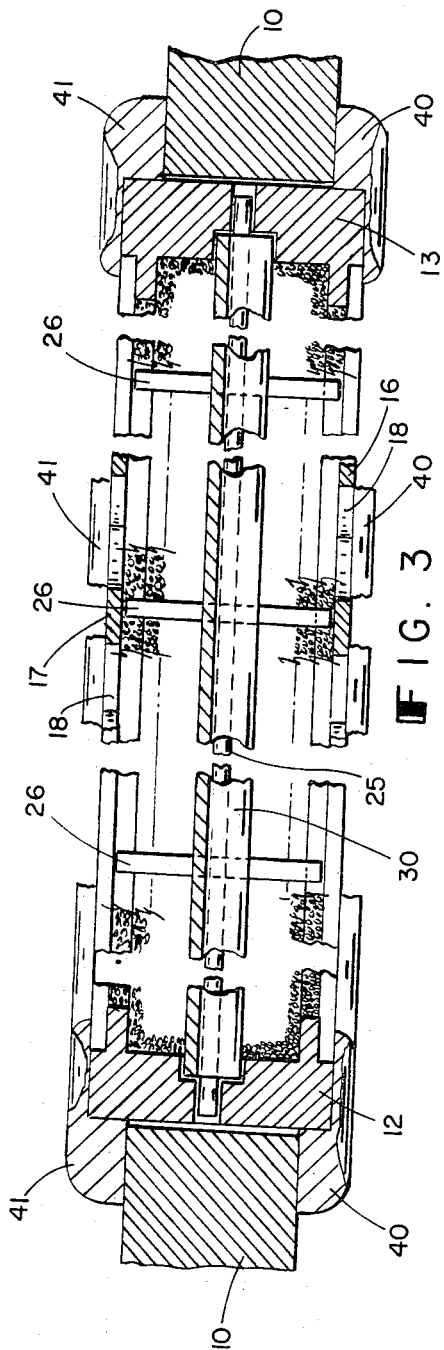

United States Patent Office 3,417,839
Patented Dec. 24, 1968

3,417,839
AIR VENTILATOR SOUND CONTROL ASSEMBLY
Robert D. Lowry and John W. Harrison, Winchester, Mass., assignors to Lowry Development Corporation, Winchester, Mass., a corporation of Massachusetts
Filed Jan. 31, 1967, Ser. No. 612,957
4 Claims. (Cl. 181—50)

ABSTRACT OF THE DISCLOSURE

A sound control assembly for an air ventilator has a baffle made of continuous lead sheeting for sound absorption interposed in the direct cross air path with the sheeting being corrugated to provide oppositely facing indentations presenting angled, and preferably perpendicular, surfaces for reflecting sound waves back in the direction of their entering paths, space being provided around edges of the baffle for permitting air to pass tortuously through the assembly around the baffle.

---

This invention relates to structural sound control assemblies associated with air ventilators, particularly with panel-type ventilators such as are incorporated in doors or transoms.

In installing central air conditioning systems in multi-room buildings, in order to lessen expense, one or more rooms may not have any exhaust outlet. Rather, the system, though it has individual inlets for each room, is designed for exhaust passage of air from individual rooms through or beneath doors to a common exhaust outlet located in a corridor, hallway, lobby or at some other central location. To prevent too great velocity when a door is closed, with resulting uncomfortable drafts, the exhaust space through or around the door must be made larger than that which would be chosen to give maximum sound isolation and privacy.

While it has heretofore been proposed, for lessening sound transmission, to make such passages labyrinthic, as by the interposition of louvers, such expedients are not wholly satisfactory, particularly where a door thickness is so small as to allow for little labyrinthic structure.

The present invention has as an object the production of a panel-type ventilator which is highly effective, even at narrow door thicknesses, in minimizing transmission of sound without detrimental interference with proper air flow. In accordance with the invention, a ventilating passage in a door or other panel or wall has an imperforate baffle element interposed across the entire path of direct air cross-flow, such element being constituted of a material and being of a contour such as to provide both sound absorption and sound reflection, with space being provided around the edges of the baffle element for the flow of air in tortuous paths around the baffle.

The baffle element therefore has a double function by reason of both its capacity for great sound absorption and its sound reflective contour. The material which we have found most useful for such a sound baffle element is sheet lead because of its high density and consequent high sound absorption quality and its easy fabrication into the required contour to provide a continuous surface panel having corrugations forming angled surfaces which will reflect sound from one surface to an adjoining angularly related surface and hence backwardly in the direction of the entering sound wave. Preferably, the adjoining surfaces formed by the corrugations are at right angles to each other so the double reflection sends the sound waves back in a plane parallel to their entering paths.

A typical embodiment of the invention is shown in the accompanying drawings, wherein:

FIG. 1 is a side elevational view (broken away to indicate extent) positioned in a fragment of a conventional door;

FIG. 2 is a cross-sectional view taken along the line 2—2 of FIG. 1; and

FIG. 3 is a cross-sectional view taken along the line 3—3 of FIG. 1.

In the drawings, 10 indicates a fragment of a typical door which has been provided with a cut-out to permit insertion of a ventilator assembly. This assembly includes a frame having opposed channel-shaped side frames 12, 13 and opposed top and bottom channel-shaped frames 14 and 15 contoured to position a pair of opposed parallel face plates 16 and 17 forming walls which have one or more perforations 18 in their central areas.

The side frames 12 and 13 have pairs of opposed holes 20 and 21 into which a top rod 24 and a bottom rod 25 are inserted, respectively, the rods being additionally supported throughout their lengths by a series of laterally spaced support plates 26, the number of which may be chosen as required by the length of the ventilator.

Suspended between the rods 24 and 25 is a single sheet of lead for example, of .050 inch in thickness, which is contoured into a zigzag shape to provide oppositely facing staggered indentations or grooves formed by adjacent sections of the material joined at included right angle bends 27 at the bottoms of the indentations. As shown in FIG. 2, there are four indentations facing one way preferably the source of greater amounts of sound and three the other way. The sheet of lead 30 may be conveniently suspended between the two rods 24 and 25 by wrapping the top and bottom marginal portions of the sheet 30 around the rods, the sheet being suitably notched, top and bottom, to accommodate the rod supports 26. Such wrapping is shown at the top at 32 and at the bottom at 34. The air passages over the wrapped rod 24 and under the wrapped rod 25 are preferably lined with a sound-absorbing material such as minute rubber particles which are deposited on the surfaces thereof as shown at 36, a suitable binding and bonding agent being used to secure the particles in a fairly thick layer.

The ventilator assembly may be held in position as by moulding pieces 40 and 41 fitted around the assembly and fastened in any conventional manner to the door 10 around the cut-out opening therein.

Tests, based on the distance from the door that extinction of sound coming from a given sound generator on the other side of the door occurs, show that the assembly shown in the drawing is approximately three times as effective as a ventilator wherein the baffle element 30 is a plane sheet of the same material of the same thickness suspended between the rods. That such additional effectiveness is present can be explained by the contouring of the element 30, which, in combination with the use of an effective sound absorbing material such as lead, causes a reflection of sound from one angled surface to the other and then back parallel to the entering course of sound, with the double impingement affording increased opportunity for absorption by the lead.

What is claimed is:
1. A sound control assembly adapted to be mounted in an air ventilator opening comprising
a frame having a pair of walls defining opposed openings,
spacing means for holding said walls in separated relation,
a continuous surface sound baffle element extending in generally parallel spaced relation between said walls and overlapping the opening in at least one of said walls,
said baffle element comprising a continuous imperforate sheet of lead having a corrugated cross-sectional contour forming series of adjoining angularly related surfaces on both sides of said baffle element facing the openings in said walls for reflecting sound waves impinging on any of said surfaces to an adjoining angularly related surface and thence back in the direction of the entering path of movement of sound through said openings, there being free space for the passage of air through the opening in one wall along tortuous paths around the edges of said baffle element and out through the opening in the other wall.

2. An assembly as claimed in claim 1, wherein said adjoining baffle element surfaces are at right angles to each other.

3. An assembly as claimed in claim 1, including a pair of parallel vertically spaced support members for said baffle having their opposite ends seated in opposing vertically extending portions of said spacing means, said members extending horizontally above and below, respectively, the openings in said walls and parallel to said walls, laterally across said assembly, said baffle element being supported vertically between said support members, the free space for the passage of air along tortuous paths being disposed both above and below said support members.

4. A door panel having parallel opposite faces interrupted by an air ventilator opening, and a sound baffle assembly as claimed in claim 1, mounted in said opening with said walls extending parallel to said door faces on the opposite sides of said door.

References Cited

UNITED STATES PATENTS

| | | |
|---|---|---|
| 1,540,931 | 6/1925 | Duncanson. |
| 1,938,798 | 12/1933 | Bourne. |
| 2,085,436 | 6/1937 | Maurer. |
| 3,061,056 | 10/1962 | Kodaras. |

FOREIGN PATENTS 1,018,084    1/1966    Great Britain.

ROBERT S. WARD, JR., *Primary Examiner.*

U.S. Cl. X.R.

181—33